United States Patent [19]

Takago et al.

[11] Patent Number: 5,247,046
[45] Date of Patent: Sep. 21, 1993

[54] RTV SILICONE RUBBER COMPOSITIONS AND CURED PRODUCTS

[75] Inventors: Toshio Takago; Shinichi Sato, both of Annaka; Noriyuki Koike, Tano; Takashi Matsuda, Annaka, all of Japan

[73] Assignee: Shin-etsu Chemical Co., Ltd., Tokyo, Japan

[21] Appl. No.: 987,681

[22] Filed: Dec. 9, 1992

[30] Foreign Application Priority Data

Dec. 12, 1991 [JP] Japan .................................. 3-351555

[51] Int. Cl.$^5$ .............................................. C08G 77/06
[52] U.S. Cl. ........................................ 528/15; 528/31; 528/35; 528/901
[58] Field of Search ...................... 528/15, 35, 31, 901

[56] References Cited

U.S. PATENT DOCUMENTS 4,871,827 10/1989 Klosowski et al. .................. 528/35

Primary Examiner—Melvyn I. Marquis
Attorney, Agent, or Firm—Birch, Stewart, Kolasch & Birch

[57] ABSTRACT

A RTV silicone rubber composition comprising (A) an organopolysiloxane composed predominantly of a silalkylenesiloxane unit and containing an aliphatic unsaturated group in a molecule, (B) an organohydrogenpolysiloxane having at least two SiH groups in a molecule, and (C) a platinum group compound cures into a transparent elastomer which is increased in rubbery strength without adding a filler.

13 Claims, No Drawings

RTV SILICONE RUBBER COMPOSITIONS AND CURED PRODUCTS

BACKGROUND OF THE INVENTION

1. Field of the Invention

This invention relates to a room temperature vulcanizable (RTV) silicone rubber composition and a cured product thereof. More particularly, it relates to a RTV silicone rubber composition which readily cures to a rubbery product having improved rubbery strength and transparency by allowing it to stand at room temperature or by moderately heating.

2. Prior Art

Nowadays silicone rubber compositions are widely used in a variety of fields because their cured products have improved properties including heat resistance, low-temperature resistance, mold release and weathering resistance.

RTV silicone rubber compositions of the type in which linear organopolysiloxane polymers as a base component cure through peroxide, condensation or addition reaction, however, suffer from the problem that cured products have a low tensile strength of the order of several kg/cm$^2$. To overcome this problem, the silicone rubber compositions are generally filled with silica fine powder for reinforcement whereby the tensile strength of cured products is increased to about 10 to 140 kg/cm$^2$. The filler loading, in turn, invites some inconvenient problems that the loaded compositions are increased in viscosity and thus aggravated in flow and cured products lose transparency.

SUMMARY OF THE INVENTION

An object of the present invention is to provide a RTV silicone rubber composition which is free of a filler and cures to products having increased rubbery strength and transparency.

According to the present invention, there is provided a room temperature vulcanizable silicone rubber composition comprising (A) an organopolysiloxane composed predominantly of a silalkylenesiloxane unit of the general formula:

wherein R$^1$, R$^2$, R$^3$ and R$^4$ are independently selected from substituted or unsubstituted monovalent hydrocarbon groups and n is an integer of 4 to 16, said organopolysiloxane containing an aliphatic unsaturated group in a molecule, (B) an organohydrogenpolysiloxane having at least two SiH groups in a molecule, and (C) a platinum group compound.

The inventors have found that by using an organopolysiloxane composed predominantly of a silalkylenesiloxane unit as defined above as a silicone rubber component, the resulting RTV silicone rubber composition can be cured into elastomers which are increased in tensile strength without a need of adding fillers such as silica powder to the composition. The cured elastomers remain transparent.

DETAILED DESCRIPTION OF THE INVENTION

The first essential component of the RTV silicone rubber composition according to the present invention is (A) an organopolysiloxane composed predominantly of a silalkylenesiloxane unit of formula (1) and containing an aliphatic unsaturated group in a molecule.

In formula (1), n is an integer of 4 to 16 and R$^1$, R$^2$, R$^3$ and R$^4$ are independently selected from substituted or unsubstituted monovalent hydrocarbon groups, preferably monovalent hydrocarbon groups having 1 to 8 carbon atoms, for example, alkyl groups such as methyl, ethyl and propyl groups, cycloalkyl groups such as a cyclohexyl group, alkenyl groups such as vinyl, allyl and isopropenoxy groups, aryl groups such as phenyl and tolyl groups, and substituted ones of these groups in which some hydrogen atoms are replaced by halogen atoms or the like, such as 3,3,3,-trifluoropropyl, 6,6,6,5,5,4,4,3,3-nonafluorohexyl, chloromethyl and 3-chloropropyl groups. Groups R$^1$ to R$^4$ may be identical or different.

In addition to the silalkylenesiloxane unit of formula (1), the organopolysiloxane may contain another unit or units such as R$^5$R$^6$SiO and R$^7$R$^8$R$^9$SiO$_{\frac{1}{2}}$ units wherein R$^5$ to R$^9$ are as defined for R$^1$ to R$^4$ and may be identical or different.

The organopolysiloxane should preferably contain at least 50 mol %, more preferably at least 70 mol % of the silalkylenesiloxane unit of formula (1) based on the entire siloxane units. With a silalkylenesiloxane content of less than 50 mol %, cured products would have low strength.

More specifically, the organopolysiloxane may comprise 50 to 100 mol %, preferably 70 to 100 mol % of the silalkylenesiloxane unit of formula (1), 0 to 50 mol %, preferably 0 to 30 mol % of R$^5$R$^6$SiO unit and 0.01 to 2 mol %, preferably 0.01 to 1 mol % of R$^7$R$^8$R$^9$SiO$_{\frac{1}{2}}$ unit.

The organopolysiloxane contains at least one aliphatic unsaturated group in its molecule either at an intermediate or at a terminal of its molecular chain. The content of an aliphatic unsaturated group is preferably up to 0.5 mol, more preferably up to 0.1 mol per 100 grams of the organopolysiloxane. An aliphatic unsaturated group content of more than 0.5 mol/100 grams would result in an elastomer which is increased in crosslinking density and thus reduced in elongation.

Preferably, the organopolysiloxane has a viscosity of 25 to 500,000 centistokes (cs) at 25° C., more preferably 1,000 to 100,000 cs at 25° C.

Some illustrative, non-limiting, examples of organopolysiloxane (A) are given below. In the following formulae, Me is a methyl group and Ph is a phenyl group and this abbreviation is used throughout the specification.

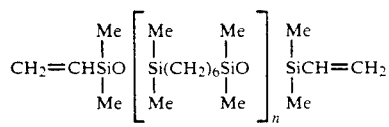
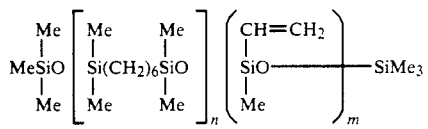
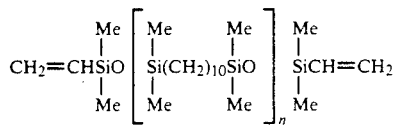
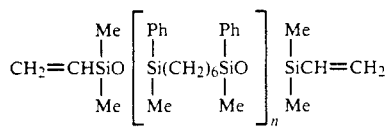
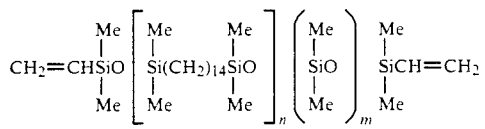
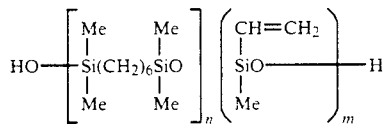
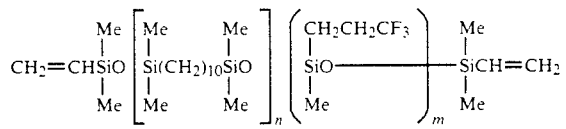
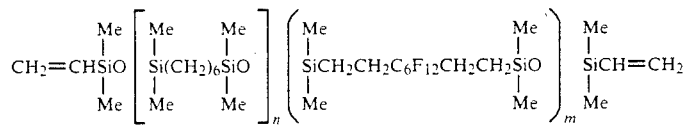
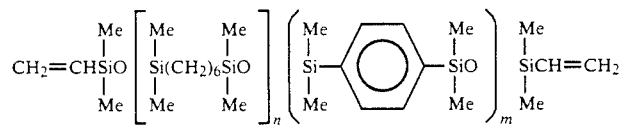
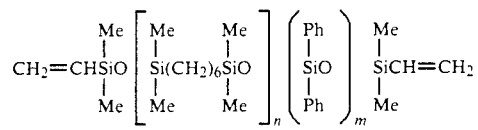
The organopolysiloxane may be synthesized, for example, by the following reaction scheme.
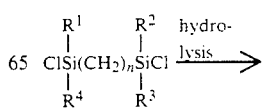
(2)

-continued

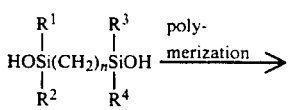

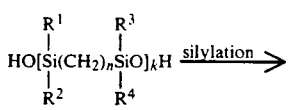

(3)

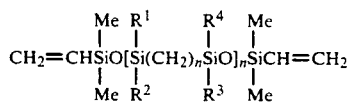

The starting reactant, that is, compound of formula (2) may be selected in accordance with the silalkylenesiloxane unit of the organopolysiloxane. The compound of formula (2) may be hydrolyzed in a conventional procedure. The hydrolyzed compound is then polymerized in a conventional procedure to form a compound of formula (3) as an intermediate. The compound of formula (3) is further copolymerized with disilanols and analogs to synthesize silalkylenesiloxane polymers. The disilanols and analogs used in this silylation are shown below.

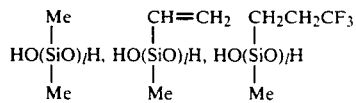

wherein l is 2 to 100.

Preferably, the silylation reaction may be promoted by using a silylating agent. Exemplary silylating agents are of the following formulae.

X is a halogen,

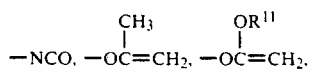

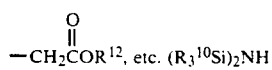

$R^{10}$ to $R^{12}$ are as defined for $R^1$ to $R^4$.

Where the silylation reaction takes place in the presence of such a silylating agent, any of the following groups can be introduced at the terminal of the resulting polymer.

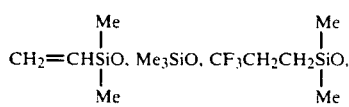

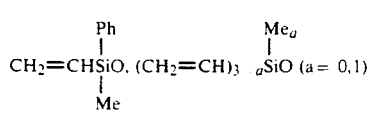

It will be understood that the silylation reaction is performed under conventional conditions.

The second essential component is (B) an organohydrogenpolysiloxane having at least two SiH groups in a molecule. It functions as a crosslinking agent.

The organohydrogenpolysiloxane is not particularly limited in form, molecular weight or the like and may be linear or cyclic and have a low or high molecular weight. Often those having a relatively low molecular weight of lower than 30,000 are preferred because of ease of manufacture. The conventional organohydrogenpolysiloxanes can be used as component (B). The organohydrogenpolysiloxane as a crosslinking agent should preferably be compatible with component (A) in order to provide a uniformly cured product.

Examples of the organohydrogenpolysiloxane are compounds of the following structures.

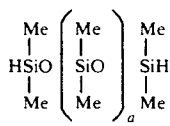

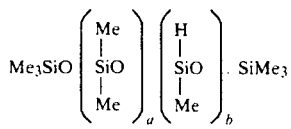

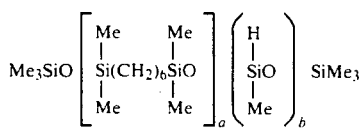

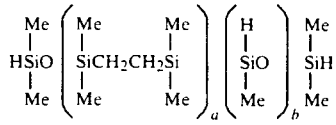

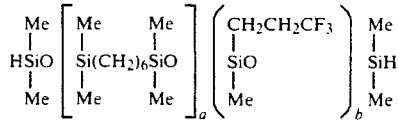

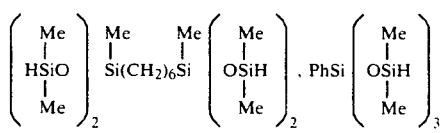

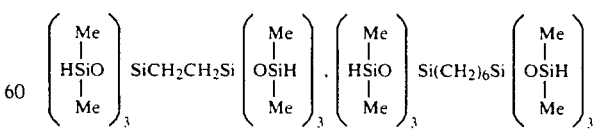

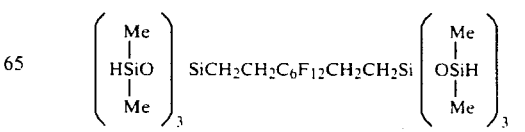

-continued

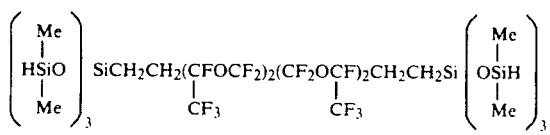

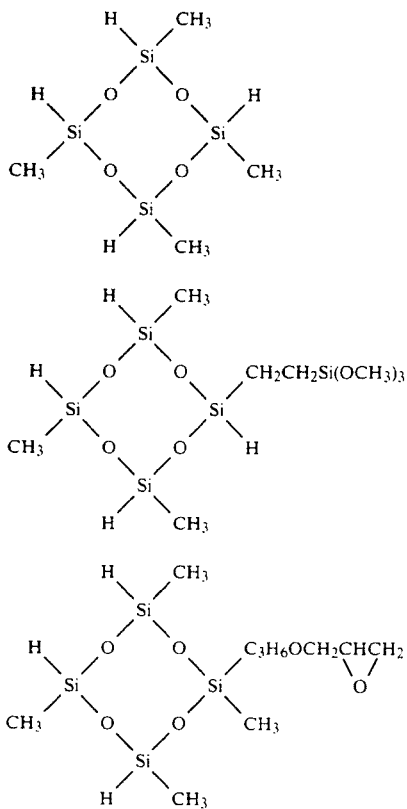

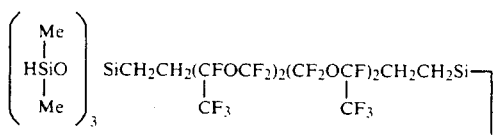

The organohydrogenpolysiloxane may be synthesized by any conventional procedure. For example, it is synthesized (1) by equilibration among the components:

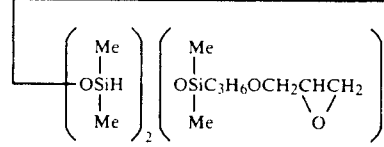

wherein e is a number of 3 to 8 in the presence of an acid catalyst such as sulfuric acid, (2) by co-hydrolysis reaction of corresponding silanes or siloxanes, or (3) by partial addition reaction where a special functional group is present in accordance with the teaching of Japanese Patent Publication (JP-B) No. 33540-1976.

Preferably, component (B) or organohydrogenpolysiloxane is blended in an amount of 0.1 to 50 parts, more preferably 1 to 10 parts by weight per 100 parts by weight of component (A). In particular, the organohydrogenpolysiloxane is preferably blended in such amounts that 0.5 to 5 mol, especially 1.2 to 3 mol of SiH group is present per mol of the aliphatic unsaturated group in the entire composition. An organohydrogenpolysiloxane content below the above-defined range would lead to a lower degree of crosslinking whereas above the range, the composition would foam and some properties like heat resistance and compression set would be adversely affected.

As the third essential component, the composition of the invention contains (C) a platinum group compound which serves as a catalyst for promoting addition reaction or hydrosilylation between components (A) and (B).

Any of platinum group compounds may be used although they are generally expensive because they are noble metal compounds. Among others, platinum compounds are preferred because of ease of availability. Examples of the platinum compound include chloroplatinic acid, complexes of chloroplatinic acid with olefins (e.g., ethylene), alcohols, and vinylsiloxanes, as well as solid catalysts such as platinum on silica, alumina and carbon supports. To obtain more uniformly cured products, chloroplatinic acid or a complex thereof is desirably dissolved in a suitable solvent so that it may be miscible with component (A).

Besides the platinum compounds, compounds of rhodium, ruthenium, iridium and palladium may also be used as component (C). Examples are $RhCl(C_2H_4)_2$, $Ru_3(CO)_{12}$, $IrCl(CO)(PPh_3)_2$, $Pd(PPh_3)_4$, $RhCl(PPh_3)_3$, and $RhCl(CO)(PPh_3)_2$.

Component (C) is used in a catalytic amount, although the amount of component (C) blended is preferably about 1 to 1,000 ppm, more preferably about 10 to 500 ppm especially when the cost is taken into account.

In addition to the above-mentioned essential components (A) to (C), the composition of the invention may contain any other optional components or additives. Exemplary such additives are organopolysiloxanes of the resin structure comprising $SiO_2$, $CH_2=CH(R')_2SiO_{\frac{1}{2}}$ and $R'_3SiO_{\frac{1}{2}}$ units wherein R' is a monovalent hydrocarbon group free of an aliphatic unsaturated double bond which are added to enhance the strength of the resulting cured elastomers (see JP-B 26771/1963 and 9476/1970); polysiloxanes comprising a $CH_2=CH(R)SiO$ unit wherein R is a substituted or unsubstituted monovalent hydrocarbon group which are added to control the curing rate of the compositions (see JP-B 10947/1973); acetylene compounds (see U.S. Pat. No. 3,445,420 and JP-B 3774/1979); and ionic heavy metal compounds (see U.S. Pat. No. 3,532,649). It is also acceptable to add non-functional organopolysiloxanes for the purposes of improving thermal shock resistance and flexibility. Where these additives are blended, their amount is preferably adjusted such that 0.5 to 5 hydrogen atoms directly attached to silicon atoms are present per unsaturated bond given as the total of alkenyl and ethynyl groups directly attached to silicon atoms in the entire composition.

Insofar as the objects of the present invention are achieved, a filler may be added to the composition of the invention for the purposes of reducing thermal shrinkage upon curing, reducing the thermal expansion, improving the thermal stability, weather resistance, chemical resistance, flame retardancy, and mechanical strength, and reducing the gas permeability of cured products or elastomers. Examples of the filler include fumed silica, quartz powder, glass fibers, carbon, metal oxides such as iron oxide, titanium oxide, and cerium oxide, and metal carbonates such as calcium carbonate and magnesium carbonate. Fumed silica is preferred since it can maintain cured products transparent. If necessary, any suitable one of pigments, dyes and antioxidants may be added.

Depending on a particular application and purpose, the silicone rubber composition of the invention may be dissolved in a suitable organic solvent such as toluene and xylene to a desired concentration before use.

The silicone rubber composition of the invention may cure at room temperature depending on the type of functional group of component (A) and the type of catalyst (C). Alternatively, the composition is cured by moderate heating, for example, heating at 100° to 150° C. for a relatively short time of several minutes to several hours.

There has been described a RTV silicone rubber composition which cures to a transparent elastomer having high rubbery strength.

EXAMPLE

Examples of the present invention are given below by way of illustration and not by way of limitation. All parts are by weight.

EXAMPLE 1 AND COMPARATIVE EXAMPLE 1

Silicone rubber composition A was prepared by blending the following components: 100 parts of an organopolysiloxane containing a silalkylenesiloxane unit (viscosity 12,300 cs, vinyl group content 0.008 mol/100 g) of formula (4):

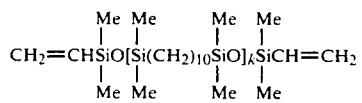

2.5 parts of methylhydrogenpolysiloxane (viscosity 11 cs) of formula (5):

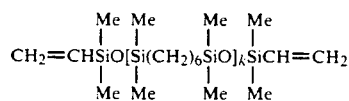

0.1 parts of a toluene solution of a chloroplatinic acid modified with

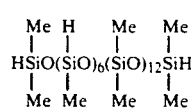

catalyst (platinum concentration 1.0% by weight), and 0.1 parts of cyclotetrasiloxane of formula (6):

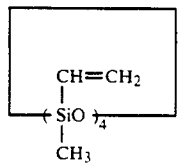

Composition A was deaerated in vacuum, cast into a mold cavity dimensioned 13×17×0.20 cm, and cured at 100° C. for 60 minutes, obtaining a transparent elastomer (Example 1).

Silicone rubber composition B was prepared by blending the same components as composition A except that the compound of formula (4) was replaced by a dimethylpolysiloxane blocked with a vinyl group at each end (viscosity 5,000 cs). It was similarly cured, obtaining a transparent elastomer (Comparative Example 1).

EXAMPLE 2

Silicone rubber composition C was prepared by blending the following components: 100 parts of an organopolysiloxane containing a silalkylenesiloxane unit (viscosity 22,300 cs, vinyl group content 0.007 mol/100 g) of formula (7):

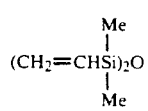

2.2 parts of methylhydrogenpolysiloxane of formula (5) used in Example 1, 0.05 parts of a 2-ethylhexanol-modified chloroplatinic acid catalyst (platinum concentration 2.0% by weight), and 0.05 parts of cyclotetrasiloxane of formula (6) used in Example 1.

Composition C was cured as in Example 1, obtaining a transparent elastomer.

The elastomers of Examples 1 and 2 and Comparative Example 1 were measured for physical properties in accordance with JIS K-6301. The results are shown in Table 1.

TABLE 1

|  | Example 1 | Comparative Example 1 | Example 2 |
| --- | --- | --- | --- |
| Silicone rubber composition | A | B | C |
| Specific gravity | 0.89 | 0.98 | 0.88 |
| Hardness, JIS A scale | 18 | 20 | 23 |
| Elongation, % | 260 | 180 | 280 |
| Tensile strength, kfg/cm² | 23 | 3 | 16 |

As is evident from Table 1, those silicone rubber compositions containing an organopolysiloxane having a silalkylenesiloxane unit and an aliphatic unsaturated group (Examples 1 and 2) cure into elastomers having higher strength than the silicone rubber composition containing dimethylpolysiloxane (Comparative Example 1).

EXAMPLE 3 AND COMPARATIVE EXAMPLE 2

Silicone rubber composition D was prepared by blending the following components: 100 parts of an organopolysiloxane containing a silalkylenesiloxane unit (viscosity 12,300 cs, vinyl group content 0.008 mol/100 g) of formula (8):

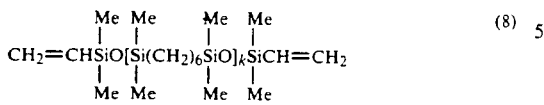

2.5 parts of methylhydrogenpolysiloxane of formula (5) used in Example 1, 0.05 parts of a 2-ethylhexanol-modified chloroplatinic acid catalyst (platinum concentration 2.0% by weight), 0.05 parts of cyclotetrasiloxane of formula (6) used in Example 1, and 15 parts of fumed silica treated with a trimethylsiloxy group having a specific surface area of 200 m²/g.

Composition D was deaerated in vacuum, cast into a mold cavity dimensioned 13×17×0.20 cm, and cured at 120° C. for 20 minutes, obtaining a transparent elastomer (Example 3).

Silicone rubber composition E was prepared by blending the same components as composition D except that the compound of formula (8) was replaced by a dimethylpolysiloxane blocked with a vinyl group at each end (viscosity 5,000 cs). It was similarly cured, obtaining a milky white elastomer (Comparative Example 2).

These elastomers were measured for physical properties in accordance with JIS K-6301. The results are shown in Table 2.

TABLE 2

|  | Example 3 | Comparative Example 2 |
|---|---|---|
| RTV Silicone rubber composition | D | E |
| Specific gravity | 0.96 | 1.06 |
| Hardness, JIS A scale | 45 | 37 |
| Elongation, % | 360 | 320 |
| Tensile strength, kfg/cm² | 165 | 22 |

As is evident from Table 2, the silicone rubber composition containing an organopolysiloxane having a silalkylenesiloxane unit and an aliphatic unsaturated group (Example 3) cures into an elastomer which remains transparent despite the blending of fumed silica because of the proximity of the respective refractive indexes. The reinforcement by fumed silica is more significant than the silicone rubber composition containing dimethylpolysiloxane (Comparative Example 2).

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A room temperature vulcanizable silicone rubber composition comprising (A) an organopolysiloxane composed predominantly of a silalkylenesiloxane unit of the general formula:

wherein $R^1$, $R^2$, $R^3$ and $R^4$ are independently selected from substituted or unsubstituted monovalent hydrocarbon groups and n is an integer of 4 to 16, said organopolysiloxane containing an aliphatic unsaturated group in a molecule, (B) an organohydrogenpolysiloxane having at least two SiH groups in a molecule, and (C) a platinum group compound.

2. The composition of claim 1 wherein organopolysiloxane (A) contains at least 50 mol % of a silalkylenesiloxane unit of formula (1).

3. The composition of claim 1 wherein organopolysiloxane (A) contains up to 0.5 mol of an aliphatic unsaturated group per 100 grams of the organopolysiloxane.

4. The composition of claim 1 wherein organohydrogenpolysiloxane (B) has a molecular weight of up to 300,000.

5. The composition of claim 1 which contains 100 parts by weight of organopolysiloxane (A), 0.1 to 50 parts by weight of organohydrogenpolysiloxane (B), and a catalytic amount of platinum group compound (C).

6. A cured product of the composition of any one of claims 1 to 5.

7. The composition of claim 2, wherein said organopolysiloxane (A) contains 70 to 100% of the silalkylenesiloxane unit of formula (1).

8. The composition according to claim 1, wherein $R^1$, $R^2$, $R^3$ and $R^4$ are each independently selected from the group consisting of monovalent hydrocarbon groups having 1 to 8 carbon atoms and halogenated derivatives thereof.

9. The composition according to claim 1, wherein n is 6, 10, or 14.

10. The composition according to claim 5 wherein 1 to 10 parts, by weight, of organohydrogenpolysiloxane (B) are present per 100 parts by weight of organopolysiloxane (A).

11. The composition according to claim 1, wherein said organohydrogenpolysiloxane (B) is contained in an amount such that 0.5 to 5 mol of SiH group are present per 1 mol of aliphatic unsaturated group in the entire composition.

12. The composition according to claim 11, wherein said organohydrogenpolysiloxane (B) is contained in an amount such that 1.2 to 3 mol of SiH group are present per 1 mol of aliphatic unsaturated group in the entire composition.

13. The composition according to claim 3, wherein said organohydrogenpolysiloxane (B) is contained in an amount such that 1.2 to 3 mol of SiH group are present per 1 mol of aliphatic unsaturated group in the entire composition.

* * * * *